Figure 1:
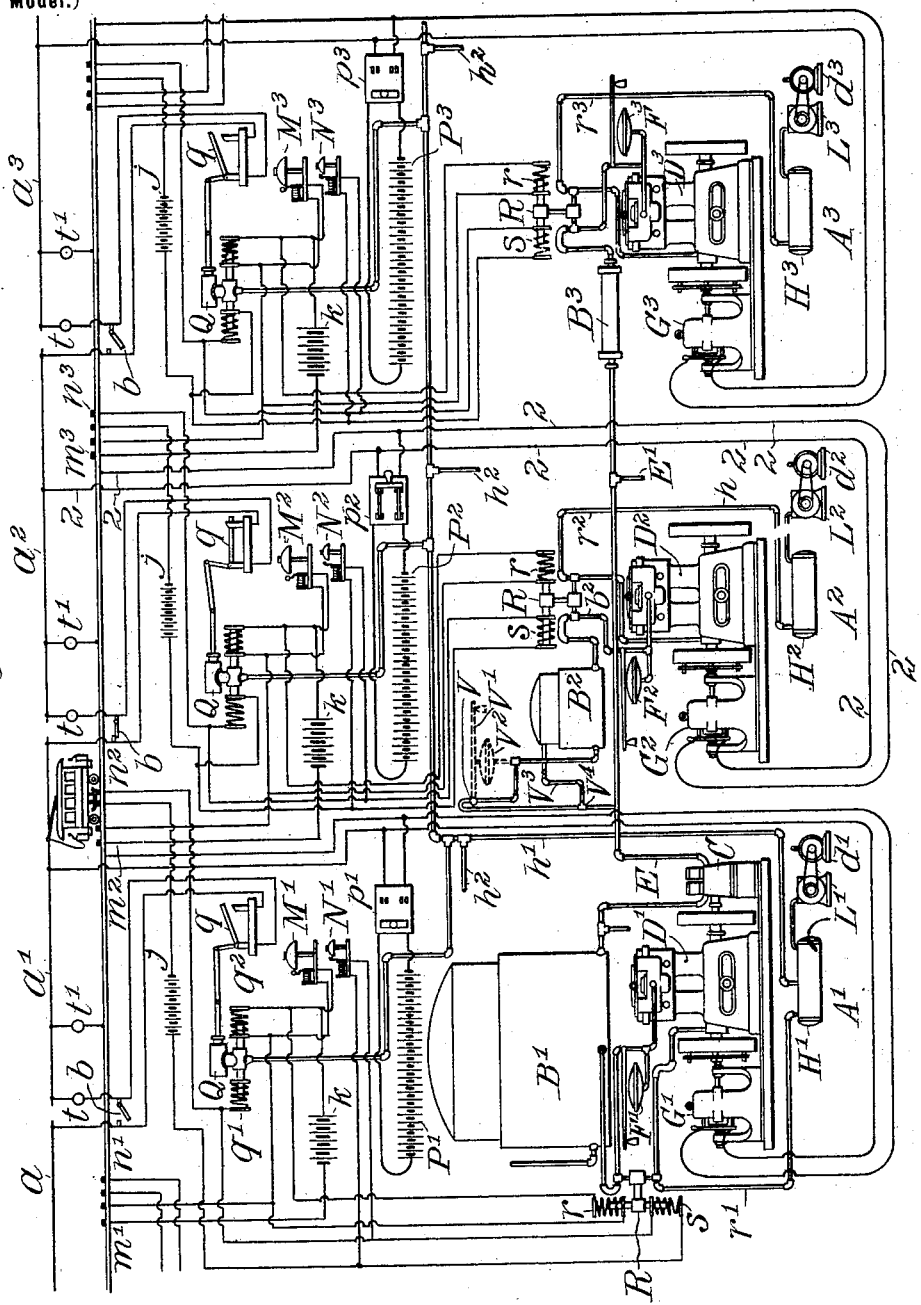

No. 645,613. Patented Mar. 20, 1900.
G. WESTINGHOUSE.
APPARATUS FOR DISTRIBUTING ENERGY.
(Application filed Nov. 13, 1899.)
(No Model.) 2 Sheets—Sheet 1.

Witnesses:
C. L. Belcher
G. H. Stockbridge

Inventor
George Westinghouse
By
Charles A. Terry
Attorney

No. 645,613. Patented Mar. 20, 1900.
G. WESTINGHOUSE.
APPARATUS FOR DISTRIBUTING ENERGY.
(Application filed Nov. 13, 1899.)

(No Model.) 2 Sheets—Sheet 2.

Witnesses:
C. L. Belcher
G. H. Stockbridge

Inventor
George Westinghouse
By
Charles A. Terry
Attorney

UNITED STATES PATENT OFFICE.

GEORGE WESTINGHOUSE, OF PITTSBURG, PENNSYLVANIA.

APPARATUS FOR DISTRIBUTING ENERGY.

SPECIFICATION forming part of Letters Patent No. 645,613, dated March 20, 1900.

Application filed November 13, 1899. Serial No. 736,768. (No model.)

*To all whom it may concern:*

Be it known that I, GEORGE WESTINGHOUSE, a citizen of the United States, and a resident of Pittsburg, in the county of Allegheny and State of Pennsylvania, have invented certain new and useful Improvements in Apparatus for the Distribution of Energy, of which the following is a specification.

My invention relates to apparatus for the economical generation and distribution of electrical energy, heat, and power peculiarly adapted for use in the operation of railways and other extended systems for the distribution of power, heat, and light.

Heretofore it has been customary in supplying electricity to electric railways and other systems operating over considerable distances to locate at some convenient point or points one or more power-houses wherein are established boilers, engines, and electric generators from which are led electric conductors to different points along the line or system and by means of these to feed either directly or through suitable potential regulating devices into the operating-circuits. The capital required to install the apparatus for a system of distribution of the kind above described is great, and the cost of the generation of electricity due to the continuous operation of practically the entire generating plant for the purpose of keeping the working circuit at all times supplied with current is, without taking into consideration the capital invested, when trains or cars are infrequently run or when there is a widely-varying demand for current so excessive as to practically prohibit the use of electricity for the propulsion of railway-trains and vehicles or to greatly decrease the returns on the capital invested for general heat, light, and power distribution. Especially in operating long-distance high-speed railways there are during the day considerable intervals of time elapsing between the passage of successive trains, and when the entire electric circuit is constantly charged from a central power-station there is the consequent large loss of energy due to leakages throughout the system and to the resistance which the main electric conductors offer to the flow of the large quantities of current required. If, however, current were supplied to different portions of the main and working circuits during only the times when they are called upon to deliver current, a very large saving in the power to develop the required electrical energy would be effected and largely because of the well-established fact that the consumption of fuel by an engine running at its normal speed, but without a load, is from thirty to forty per cent. as great as when the engine is operated at full load.

In those cases where steam is used as the motive force the boilers and engines with the required generators must be arranged within a suitable power-building with the shortest possible distance intervening between the boilers and engines to avoid loss by radiation, and, further, owing to the necessity for always keeping spare engines well heated and some of them even in motion and the boilers well fired and ready for any sudden demand for extra or extraordinary service, it is the practice and seems to be desirable for the economical generation of electricity to depend upon one comprehensive power-station rather than upon several smaller ones. From the nature of the service required of one large or several small electric generating plants it is evident that if trains were passing over the line only at intervals of, say from twenty minutes to an hour it would be impracticable to start and stop the engines and generators with sufficient facility to effect any material saving in the cost of fuel, since the boilers would, as above stated, have to be kept in condition to instantly deliver the maximum power required. When gas-power is used, however, the gas-producing plant may be located at the most convenient point with reference to an economical supply of fuel and water, while the gas-engines and the electric generators may and should be located in substations along the line of a railway with special reference to the least cost and loss in the transmission of the current from the generators to the working circuits. To most effectively provide for the supply of current to the working circuit during only the time when the current is required, the working circuit may be subdivided, so that each subdivision receives its supply from its substation and by suitable arrangements in case of need from either or both of the adjacent substations, so that any one subdivision may receive the combined effort of the engines and generators of three substations. The readiness and economy with which gas-engines as now constructed lend themselves to quick starting, it taking less than a minute, coupled with the fact that the shutting off of the gas instantly stops waste of fuel, render them especially suited to the purposes of my invention, and I therefore propose instead of boilers, steam-engines, and electric generators all located at one station with the costly system of electric distribution involved to use a gas-producing plant and pipe distribution therefor and gas-engines and electric generators at properly-located substations, with the consequent comparatively-simple electrical system, thus realizing the advantages herein mentioned. In the case of an electric railway the gas is conveyed from the gas-producing plant through suitable main pipes extending along the lines of railway, with branches to supply each of the substations, and such gas can be used not only to drive ordinary gas-engines, but also for various other purposes, including the heating of stations and other buildings. The gas-pipe line should preferably be of wrought-iron with screwed joints and capable of standing high pressure without leakage. At the gas-generating station a suitable compressor may be employed to store gas within the pipe-line, which would serve not only to convey the gas, but also to serve as a storage-reservoir. Between the main gas-pipe and each gas-engine there are placed the usual and well-known suitable valves and regulating devices for the purpose of delivering the necessary gas to the engine at the required pressure. It is desirable to use gas-engines having two or more cylinders, one of which may be conveniently operated by compressed air for the purpose of starting the engine, and each substation should therefore be provided with a suitable air compressor and reservoir within which to store a sufficient amount of compressed air to insure the quick starting of one or all of the engines in such substations. Such compressor can be driven by an independent engine or motor, or it can be driven by the main engine through any suitable connection. While I prefer to use what is known as a gas-engine, yet any other form of internal-combustion engine may be employed, and although I prefer to use compressed air to quickly start such engine any of the other well-known means may be utilized.

In those cases where there may be great and sudden fluctuations in the use of electricity it may be economical to use storage batteries at the substations, so that the stored electric energy may be combined with the electricity produced by the engine and generator.

My invention is not limited in its application to electric railways, but it may be effectively utilized in a system for the general distribution of electric energy by locating gas-engine substations at points more or less distant from the main generating-station and where the delivery of current to a general system of distribution will be most needed when the demands are the greatest. In such an arrangement the main station may be conveniently operated with an almost even load during the twenty-four hours of each day, leaving the excess demand and the "peak of the load" to be cared for by the gas-engine plant; and it is within the scope of my invention to provide for the automatic starting and stopping of one or more gas-engines in any substation by means of electrically-operated air and gas valve mechanisms, which can be brought into service by electric circuits established between the main and substations and by any of the well-known means.

The advantages which I secure by the use of my invention are many, among which may be cited the following: Engines can be operated by means of gas generated from about one-half of the amount of coal required for steam-engines; it costs less to lay pipes to transmit power as proposed than to establish a high-tension alternating-current transmission system; the gas system of distribution is less complicated; the cost to transmit a given power is less, and the risk to derangement greatly less than with the high-tension alternating-current system operated by steam-power; and, further, there is always available a source of power and heat for a multitude of purposes not most advantageously secured directly from the electric current.

There are many possible modifications in the general organization of the system I have described and in the exact form of apparatus and details which I have illustrated in the drawings.

Figure 2:
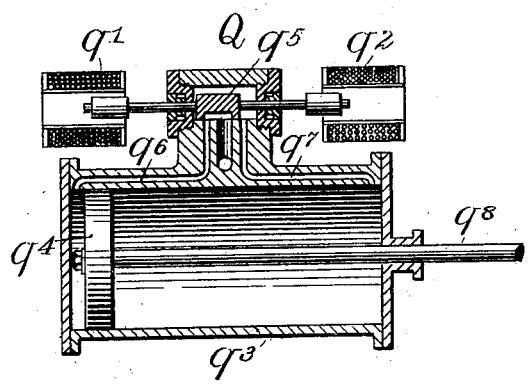

Referring to the accompanying drawings, Figure 1 is a diagram representing the general organization of the apparatus for supplying an electric-railway system, and Fig. 2 illustrates a detail.

Referring to the drawings, $A'$ $A^2$ $A^3$ represent substations located along the line of an electric railway. In this instance the supply-conductor, which may be either an overhead trolley-wire or underground wire or other suitable conductor, is shown as being subdivided into sections $a$ $a'$ $a^2$ $a^3$. The sections may, however, be connected together by means of switches or circuit-closers $b$, if desired.

At $A'$ there is represented a gas-generator plant comprising the usual apparatus for producing gas which is delivered into a reservoir $B'$. A gas-compressor is indicated at C, which may be operated by a gas-engine $D'$, and the compressor is shown as delivering gas into a pipe-line E, which extends through the various substations $A'$ $A^2$ $A^3$. It is understood that the gas-generating plant is located at some point convenient for coal and water supplies, and if it is near the electric railway it may also be equipped with an electric generating plant similar to those described in connection with substations. At substation $A^2$ there is shown a gas holder or reservoir $B^2$, supplied from the main pipe-line E. The gas-engine $D^2$ here shown is a two-cylinder engine, although engines having a greater number of cylinders may be employed. The gas for operating the engine may be delivered through a pressure reducer or regulator $F^2$ from the gas-reservoir $B^2$. An air-compressor $L^2$ may be operated by the engine or by a small motor $d^2$ for delivering compressed air into a tank $H^2$, which is provided with suitable pipes $h$ for starting the engine. The electric generator $G^2$ may be directly connected with the engine $D^2$ or driven thereby through a belt in any suitable manner. The conductors 2 2 lead from the terminals of the generator to the section $a^2$ of the supply-wire and with the return-conductor, which is here shown as being the rails of the track.

For the purpose of enabling the operator at the station $A^2$ to be informed as to when it will be necessary to start, as well as to stop, the generator signaling devices $M^2$ and $N^2$ are located at some convenient point in the station, and these are respectively connected with signaling actuating devices $M^2$ $n^2$ at suitable distances beyond the respective ends of the section to be supplied by that generator. By means of these devices the operator is advised of the approach as well as the departure of trains. In the drawings I have shown short insulated contacts constituting terminals of the circuit of corresponding batteries $j$ and $k$. As the train passes over these contacts the circuit of the corresponding battery is closed by means of a suitable bridge-piece or in any other suitable manner. The corresponding communication is thus given to the operator. The signaling-contacts are located at such distances from the section that an approaching train will give the signal a sufficient time in advance of the arrival of the train upon the section to be supplied to permit the operator to start his engine, and thus generate the necessary current to supply that section. The generator may also be used to charge a storage battery $P^2$, which, if occasion should demand, may be coupled into circuit with the generator by a switch $p^2$ for the purpose of adding to the supply of current, particularly when the demand for current is greater than can be readily supplied by the generator.

The pipe-line E is shown at station $A^2$ as supplying a gas-holder $B^2$, from which gas is supplied to the engine $D^2$ through suitable pipe $b^2$. A gas-regulator $F^2$, of any suitable well-known form, may be employed for insuring that the gas be fed to the engine at the proper pressure. The electric generator $G^2$ may be directly connected with the shaft of the engine or driven in any other suitable manner thereby.

For the purpose of shutting off the supply of gas delivered to the holder $B^2$ when it is filled any usual well-known device may be employed—such, for instance, as a cut-off V, interposed in the pipe leading thereto and operated by a lever $V'$, the position of which is controlled by an expansion device $V^2$, operating to raise the lever when the pressure in the gas-holder exceeds a predetermined limit, (these parts being shown in dotted lines,) or the cut-off may be effected, by means of a link connection $V^3$, between the movable portion of the gas-holder and a stop-cock $V^4$ in the gas-supply pipe. When the movable portion of the gas-holder has risen to a certain height, it will operate through the connection $V^3$ to close the pipe.

At stations $A'$ and $A^3$ there are provided similar organizations of gas-engine, generator, air-compressor, air-reservoir, indicating device, and storage battery, like devices being indicated by like letters of reference, with the numeral 1 or 3 affixed, as the case may be. At the station $A^3$ there is shown in lieu of a gas-holder an enlarged section $B^3$ of the main supply-pipe, and the gas for the engine is taken directly from the pipe-line through a suitable pressure-reducing device $F^3$.

When desired, current may be supplied from any generator to either or both of its neighboring sections—as, for instance, to the section $A^2$—by the generator at $A^3$ in greater or less quantities, as desired, by closing the switch $b$, and thus connecting the two sections together, and in general either generator may be employed for aiding the neighboring generators upon either or both sides. Such connections between adjacent sections may be made and interrupted automatically by switches $q$, operated by electromagnets $q'$ $q^2$, interposed in a branch circuit of the corresponding battery $j$ or $k$. Any suitable form of electropneumatic device Q may be conveniently employed for operating these switches. In the drawings I have indicated a piston-cylinder $q^3$, containing a piston $q^4$, which is forced in one direction or the other, according to the position of a slide-valve $q^5$, controlling the ports $q^6$ $q^7$. The position of the valve is controlled by the armatures of the coils $q'$ $q^2$. The shaft $q^8$ of the piston $q^4$ is coupled with the switch $q$ in such manner as to close the switch when current flows through the coil $q^2$ and to open it when flowing through the coil $q'$. The compressed air for operating the switches Q is derived from the reservoirs $H^2$ or other suitable source. The sections may at any time be connected manually by the switches $b$ independently of the switches $q$.

In some cases it may be desirable that the engine should be automatically started or stopped or both started and stopped without necessitating the presence of an attendant. This may be accomplished by any suitable automatic devices—as, for instance, there may be inserted in corresponding branches of the signaling-circuits electromagnetic devices R, which when operated by an approaching train will set in operation the gas-engine, and thus cause the generator to supply current to the circuit. The gas-engine will then continue to run until the train reaches the succeeding signaling-circuit, through which it will close the circuit necessary for shutting off the gas from the engine. In the drawings the controlling device R is shown as provided with two actuating-coils $r$ and $s$, respectively, connected to have their circuits closed when the cars pass over the corresponding circuit, closing points $m'$ $m^2$, and $m^3$, and $n'$, $n^2$, and $n^3$ to open and to close the gas-supply pipes. The operation of opening the gas-supply pipe to the engine may also serve to open the air-pipe $r^3$ to admit the compressed air to the engine for starting it. The connections of the air-pipe are again automatically closed when the engine has been started in any well-known manner, and the details of the construction of such devices are not here shown, being well known in the art.

Where two or more sections are to be supplied conjointly from neighboring generators, by closing the switches $b$ ammeters $t$ and voltmeters $t'$ may be connected with the circuits to give indications at the substations of the condition of the circuit, so that the attendants may know when the demand is such as to require additional current to be supplied from their generators.

In the drawings I have indicated only one generator at each substation. It is evident that two or more may be employed, if desired. In some cases it may be desirable to keep one generator always in operation, supplying current to neighboring portions of the line, and to start the additional generators as the load upon corresponding portions of the line is increased.

The application of the invention is not limited to electric-railway service, but is also useful in connection with electric lighting and power systems extending over wide areas, and it will be understood that the railway-circuits indicated at Fig. 1 may be replaced by electric lighting or power service of any character, and the indicating devices will serve to show when it is necessary to increase or decrease the number of generators supplying current to the different sections. If desired, special indicating-circuits may extend from one central station to all substations, and pressure-indicating circuits may extend from the different sections back to the central station.

The gas in the pipe-line E is advantageously transmitted at high pressure, by which I mean at a pressure much greater than that ordinarily safely possible to be maintained in gas-holders. This permits of the economical transmission of large amounts of gas over long distances. The gas thus transmitted may be distributed and utilized in greater or less quantities not only for operating the gas-engines, but also for lighting and heating, and I have indicated branch pipes E', designed to supply such purposes. The compressed air may also be utilized for additional purposes, and branch pipes $h^2$ are shown as leading at the stations from the compressed-air pipe $h'$. I have shown all the compressed-air reservoirs as connected together by the pipe $h'$; but it is evident that it is not necessary to so connect them. Each station may have its compressed-air equipment independent of the other stations, or one air-compressor may be utilized for supplying all the stations, if so desired.

In extending systems it may be desirable to employ more than one gas-generating station, in which cases stations similar to that indicated at A' are located at intervals along the line, and thus supply gas to the various substations as required. It is to be understood, however, that the gas-generating stations may or may not be supplied with an electric generator and its accompanying apparatus, according to the circumstances of the case.

In another application, Serial No. 701,846, filed January 11, 1899, I have made claims to the method or process herein.

The invention claimed is—

1. A combined gas and electric system of distribution for electric-railway service consisting of an electric-supply conductor for the railway, a series of electric generators located at intervals along the line of said railway, a gas-engine for driving each of said generators, a general gas-supply system for furnishing gas to all of said gas-engines, and indicating or signaling devices for indicating at the respective generators, the approach and departure of trains, upon the railway.

2. In a system of distribution, the combination at a substation, for supplying electric energy to a portion of the system, of one or more electric generators, one or more gas-engines for driving the same, signaling-circuits extending from points upon the system in the vicinity of said substations for indicating at the substations when the demand for current exceeds and when it falls below predetermined limits, and local storage batteries and compressed-air reservoirs adapted to be charged by said generators.

3. In a system of distribution for electric railways, the combination of a main gas-supply station and substations for generating electricity, one or more gas-engines at each substation and corresponding electric generators actuated thereby, a signaling device leading from a point distant from each of said stations for indicating at the respective stations the approach of trains, a storage battery at each substation, means for charging the same from the corresponding electric generator and for utilizing the current therefrom to assist the generator in supplying the electric circuit, and a gas-supply station for furnishing gas to all of said substations.

4. A system of electric distribution comprising an electric-supply circuit, one or more gas-generating stations, electric generating-stations at intervals along the line of distribution, gas-distributing pipes leading from said gas-generating stations to the electric generating-stations, gas-engines and electric generators driven thereby at the electric generating-stations, and circuit connections therefrom to the main electric circuit, and means for connecting said generators with and disconnecting them from neighboring portions of the main electric circuit in accordance with the demand for current upon such portions of the circuit.

5. In a substation for electric distribution in a system comprising one or more main gas-generating stations and electric generating-substations, the combination of one or more gas-engines, one or more electric generators operated thereby, an air-compressor, a compressed-air reservoir, and means for starting the gas-engines by means of air from the compressed-air reservoir.

6. In a substation for electric distribution in a system comprising one or more main gas-generating stations and electric generating-substations, the combination of one or more gas-engines, one or more electric generators operated thereby, an air-compressor, a compressed-air reservoir, means for starting the gas-engines by means of air from the compressed-air reservoir, and means for operating the gas-engine after it is started by means of gas supplied from the main gas-generating station.

7. The combination of a main gas-supply station, a divided electric circuit, local electric generating-stations for supplying current to the respective divisions of the circuit, means for operating the several generating-stations by energy supplied from said main gas-supply station, and means for connecting and disconnecting the several divisions of said circuit with and from each other.

8. The combination of a main gas-supply station, a divided electric circuit, local generators for supplying electric current to the respective divisions of the circuit, local gas-engines for operating the respective local generators, gas-supply pipes for supplying gas from the gas-generating station to the respective gas-engines, a source of compressed air for starting the respective gas-engines, and means for starting the respective gas-engines through the instrumentality of air from said compressed-air source in advance of the demand for electricity from the corresponding electric generators.

9. In a system for the distribution of power, heat and light, the combination of a gas-generating plant, a high-pressure gas-distributing system, local gas-engines and power-stations, electric generators operated by such gas-engines, a circuit into which said generators feed, and indicating devices at the respective power-stations for showing the condition of the circuit in the neighborhood thereof.

Signed at New York, in the county of New York and State of New York, this 10th day of November, A. D. 1899.

GEO. WESTINGHOUSE.

Witnesses:
 J. H. JONES,
 WM. H. CAPEL.